United States Patent
Zhang et al.

(10) Patent No.: US 10,085,154 B2
(45) Date of Patent: Sep. 25, 2018

(54) SYSTEM AND METHOD FOR DYNAMIC INTER-CELL INTERFERENCE COORDINATION

(71) Applicant: Huawei Technologies Co., Ltd., Shenzhen (CN)

(72) Inventors: Liqing Zhang, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 159 days.

(21) Appl. No.: 13/654,177

(22) Filed: Oct. 17, 2012

(65) Prior Publication Data
US 2014/0105122 A1   Apr. 17, 2014

(51) Int. Cl.
| H04W 4/00 | (2018.01) |
| H04W 16/06 | (2009.01) |
| H04W 72/04 | (2009.01) |
| H04L 5/00 | (2006.01) |

(52) U.S. Cl.
CPC .......... *H04W 16/06* (2013.01); *H04W 72/04* (2013.01); *H04W 72/042* (2013.01); *H04L 5/001* (2013.01); *H04L 5/0007* (2013.01); *H04L 5/0053* (2013.01); *H04W 72/0426* (2013.01)

(58) Field of Classification Search
CPC ..... H04W 28/04; H04W 72/04; H04W 24/10; H04W 48/08; H04W 72/042; H04L 5/0053; H04L 5/001; H04L 5/0007
USPC .................. 455/449, 501; 370/329
See application file for complete search history.

(56) References Cited

U.S. PATENT DOCUMENTS

| 6,128,497 A | 10/2000 | Faruque |
| 8,195,166 B1* | 6/2012 | Oprescu-Surcobe et al. ............... 455/436 |
| 8,731,567 B2 | 5/2014 | Zhang et al. |
| 2004/0229651 A1* | 11/2004 | Hulkkonen ............ H01Q 1/246 455/562.1 |
| 2005/0245266 A1 | 11/2005 | Viero et al. |
| 2006/0189321 A1* | 8/2006 | Oh ........................ H04W 16/18 455/452.2 |
| 2007/0155431 A1 | 7/2007 | Munzner et al. |

(Continued)

FOREIGN PATENT DOCUMENTS

| CN | 101009622 A | 8/2007 |
| CN | 101360321 A | 2/2009 |

(Continued)

OTHER PUBLICATIONS

Alexander L. Stolyar, et al., "Self-organizing Dynamic Fractional Frequency Reuse Through Distributed Inter-cell Coordination: The Case of Best-Effort Traffic", May 29, 2008, 27 pages.

*Primary Examiner* — Joshua Kading
*Assistant Examiner* — Atique Ahmed
(74) *Attorney, Agent, or Firm* — Slater Matsil, LLP

(57) ABSTRACT

A system including a cell controller and a method for dynamic inter-cell interference coordination based on a strong interference neighbor relationship table (SI-NRT) are provided. In the method, the cell controller generates a SI-NRT based on a predefined threshold value and interferences from a plurality of neighbor cells. The cell controller determines whether a cell needs additional high power frequency band and determines whether there is available high power frequency band in the plurality of neighboring cells based on the SI-NRT.

20 Claims, 5 Drawing Sheets

(56) References Cited

U.S. PATENT DOCUMENTS

| | | | |
|---|---|---|---|
| 2008/0039089 A1* | 2/2008 | Berkman | H04W 36/04 455/436 |
| 2008/0051096 A1* | 2/2008 | Rao | H04W 52/04 455/449 |
| 2008/0268833 A1 | 10/2008 | Huang et al. | |
| 2009/0061778 A1 | 3/2009 | Vrzic et al. | |
| 2009/0081955 A1 | 3/2009 | Necker | |
| 2009/0092059 A1 | 4/2009 | Fu | |
| 2010/0023830 A1* | 1/2010 | Wengerter | H04L 1/0025 714/748 |
| 2010/0222003 A1 | 9/2010 | Yoshii et al. | |
| 2010/0246538 A1 | 9/2010 | Kravtsov et al. | |
| 2010/0267408 A1 | 10/2010 | Lee et al. | |
| 2010/0303026 A1 | 12/2010 | Chaudhri et al. | |
| 2010/0317354 A1* | 12/2010 | Kirvar | H04W 16/18 455/447 |
| 2010/0317364 A1* | 12/2010 | Zhang | H04W 16/04 455/452.2 |
| 2010/0322227 A1 | 12/2010 | Luo | |
| 2010/0323712 A1 | 12/2010 | Guey et al. | |
| 2012/0028584 A1 | 2/2012 | Zhang et al. | |
| 2012/0028664 A1 | 2/2012 | Zhang et al. | |
| 2012/0120893 A1 | 5/2012 | Baligh et al. | |
| 2012/0122467 A1* | 5/2012 | Auer | H04W 16/10 455/452.1 |
| 2012/0122503 A1 | 5/2012 | Ma et al. | |
| 2012/0134267 A1* | 5/2012 | Noriega | H04W 72/1236 370/230 |
| 2013/0012249 A1* | 1/2013 | Centonza et al. | 455/501 |

FOREIGN PATENT DOCUMENTS

| | | |
|---|---|---|
| CN | 101400135 A | 4/2009 |
| CN | 101472339 A | 7/2009 |
| CN | 101711033 A | 5/2010 |
| CN | 101742612 A | 6/2010 |
| CN | 101765119 A | 6/2010 |
| CN | 101784116 A | 7/2010 |
| CN | 102469462 A | 5/2012 |
| CN | 102497671 A | 6/2012 |
| EP | 1 940 188 A1 | 7/2008 |
| EP | 2 101 418 A1 | 9/2009 |
| EP | 2 194 741 A1 | 6/2010 |
| GB | 2 433 378 A | 6/2007 |
| WO | WO 95/34957 A2 | 12/1995 |
| WO | WO 2009/041040 A1 | 4/2009 |
| WO | WO 2009/052754 A1 | 4/2009 |
| WO | 2012013096 A1 | 2/2012 |
| WO | 2012013101 A1 | 2/2012 |
| WO | 2012065564 A1 | 5/2012 |

* cited by examiner

SYSTEM AND METHOD FOR DYNAMIC INTER-CELL INTERFERENCE COORDINATION

FIELD

The present disclosure relates generally to digital communications, and more particularly to a system and method for self-organized inter-cell interference coordination (ICIC) based on a strong interference neighbor relationship table (SI-NRT), user equipment (UE) distributions, traffic distributions, or a combination of the above table and distributions.

BACKGROUND

Inter-cell interference (ICI) may be considered to be interference at a cell due to transmissions originating in another cell. Usually, ICI occurs between adjacent cells of a communications system. As an example, relatively high-powered transmissions to and from a cell edge user (CEU) operating in a first cell may cause more interference to adjacent cells utilizing the same operating frequency than relatively lower-powered transmissions to and from a cell center user (CCU) operating in the first cell to adjacent cells utilizing the same operating frequency due to correspondingly higher power levels of the transmissions to and from the CEU.

FIG. 1 illustrates a prior art communications system 100. Communications system 100 includes a first enhanced NodeB (eNB) 105 and a second eNB 115. An eNB (also commonly referred to as a base station, communications controller, a transmit point (TP), and so forth) usually have a hardware processor that is configured to control communications of User Equipment (UE) operating within its coverage area. For example, eNB 105 may have a coverage area illustrated in FIG. 1 as hexagon 110, while eNB 115 may have a coverage area illustrated as hexagon 120. Operating within hexagon 110 may be a first UE 125 and a second UE 130. The first and second UEs 125 and 130 may be cell phones, smart phones, tablets, or any electronic device having a hardware processor and hardware antennas capable of wireless communication with the corresponding eNB.

A coverage area of an eNB may be categorized based upon a distance to the eNB. For example, coverage area of eNB 105 (i.e., hexagon 110) may be categorized into two regions, with a first region being a cell center region (shown as circle 135) and a cell edge region (portions of hexagon 110 outside of circle 135, shown as region 140). Normally, UEs operating within the cell center region 135, such as UE 125, may receive transmissions made at a lower power level than UEs operating within the cell edge region 140, such as UE 130, due to their closer proximity to an eNB serving the coverage area.

Furthermore, since transmissions made by UEs (i.e., uplink transmissions) operating with a cell edge region, such as UE 130, are usually made at higher power levels and the UEs are also located closer to neighboring (e.g., adjacent) eNBs, the transmissions may cause more interference to the neighboring eNBs. For downlink transmissions, UEs in a first eNB (e.g., a serving eNB) that are located closer to a neighboring eNB (i.e., an adjacent eNB) may experience high interference from transmissions of the neighboring eNB than UEs operating in a cell center region of the first eNB.

ICIC is a simple and efficient ICI management scheme that attempts to reduce and/or control ICI through the use of radio resource management (RRM) methods. Typically, ICIC takes into account information from multiple cells to control ICI. ICIC in Orthogonal Frequency Division Multiple Access (OFDMA) communications systems, such as Third Generation Partnership Project (3GPP) Long Term Evolution (LTE) compliant communications system, have received considerable study in recent years.

ICIC schemes can improve cell edge user performance, especially in scenarios where the interference is dominant in the network. This is accomplished by inter-cell coordinated resource and power allocation. High power frequency band (also commonly referred to as color) assignment helps a cell to improve its UE coverage, especially for cells with high-CEU loadings.

SUMMARY

In a first illustrative embodiment, a method for assigning high power frequency bands in a communication system is implemented in a cell controller having a processor. The cell controller generates a strong interference neighbor relationship table (SI-NRT) based on a predefined threshold value and interferences from a plurality of neighbor cells. The cell controller determines whether a cell needs an additional high power frequency band and whether there is available a high power frequency band in the plurality of neighboring cells based on the SI-NRT.

In a second illustrative embodiment of the present disclosure, a cell controller includes a processor coupled with a non-transient storage medium. The non-transient storage medium stores a set of instructions for assigning high power frequency bands in a communication system. The set of instructions to direct the processor to perform acts of: generating a strong interference neighbor relationship table (SI-NRT) based on a predefined threshold value and interferences from a plurality of neighbor cells; determining whether a cell needs an additional high power frequency band; and determining whether there is available a high power frequency band in the plurality of neighboring cells based on the SI-NRT.

In a third illustrative embodiment, a communication system includes a plurality of cells communicating with each other. Each cell includes a cell controller having a processor. The processor is configured to generate a strong interference neighbor relationship table (SI-NRT) based on a predefined threshold value and interferences from a plurality of neighbor cells. The cell controller is configured to determine whether the cell needs an additional high power frequency band and whether there is available a high power frequency band in the plurality of neighboring cells based on the SI-NRT.

BRIEF DESCRIPTION OF THE DRAWINGS

For a better understanding of the present disclosure, reference is now made to the following descriptions taken in conjunction with the accompanying drawings, in which.

DETAILED DESCRIPTION

Figure 1:
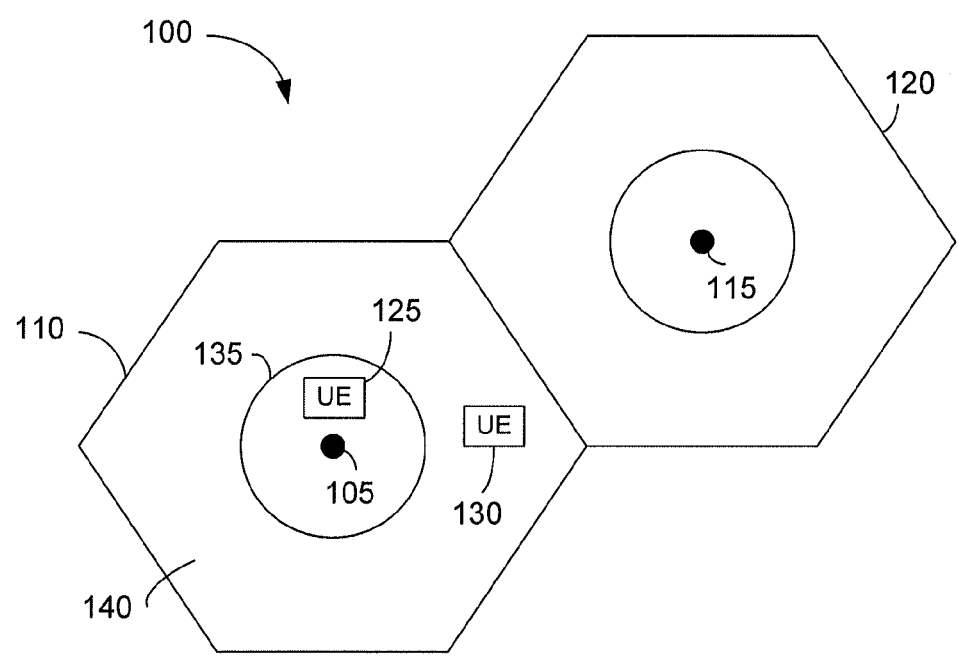
FIG. 1 illustrates a communications system in the prior art.

The making and using of the current example embodiments are discussed in details below. It should be appreciated, however, that the present disclosure provides many applicable inventive concepts that may be embodied in a wide variety of specific contexts. The example embodiments discussed are merely illustrative of specific ways to make and use the disclosure, and do not limit the scope of the disclosure. As used herein, the term "and/or" includes any and all combinations of one or more of the associated listed items.

The present disclosure will be described with respect to example embodiments in a specific context, namely a 3GPP LTE compliant communications system. The disclosure may also be applied, however, to other Orthogonal Frequency Division Multiple Access (OFDMA) communications systems, such as 3GPP LTE-Advanced, WiMAX, IEEE 802.16, and so forth, compliant communications systems.

Existing ICIC techniques include:

Manual Geo-based reuse-three planning and ICIC configuration: This scheme makes use of cell/eNB locations to manually plan a frequency patterns to avoid limited non-overlapping of three frequency bands. It is very costly to operators and the performance is poor, especially for irregular layouts, due to being location and antenna-direction based.

Fixed FFR reuse-three: This is a commonly used FFR reuse pattern for ICIC control. It has difficulty with frequency planning problems and the three modes are not sufficient to assign non-overlapping patterns when interference scenarios (e.g., large metropolitan areas) and cell neighbor relationship are complicated.

Fixed seven reuse mode: It can resolve more colors to complicated interference scenarios but can waste frequency reuse resources to certain regular field layouts when three colors are enough. This reuse mode defines one mode with less interference band for cell edge uses in all other cells, it will cause interference, e.g., when two UEs from two neighbor cells handover to another their common neighbor cell.

Fractional Frequency Reuse (FFR) is an important ICIC technique for OFDMA system. FFR reduces the interference caused by neighboring cells using the same frequency band and can thus help to increase user throughput and overall network capacity. FFR may be difficult to implement in field areas with complicated interference scenarios, such as, large metropolitan areas. For example, FFR with reuse-three cannot handle frequency planning problems and the three modes may not be sufficient to assign non-overlapping patterns. Therefore, resulting in communications system performance degradation, such as an overall coverage of the communications system and handovers (HO).

There are other FFR schemes with variable reuse factors. One is dynamic FFR based on utility (e.g., log sum rate) optimization and X2 signaling to iteratively compute the perceived utility values at each eNB and exchange them among any pair of eNBs in the network, leading to very complex network. Other ones include 6-color (6 resource sub-bands) based FFR, providing flexible and variable reuse factors from ⅙ to ⅓ bandwidth resources in each eNB; this scheme can be further enhanced to accommodate the user traffic non-uniform scenarios which is described in next paragraph.

The 6-color FFR methods divide the whole bandwidth into six sub-bands (referred to as six colors) and assign the high power bandwidth up to ⅓ of the whole bandwidth (two colors) in each cell, where the assigned high power bands between interference neighbors do not overlap. However, it is possible to assign more high power bandwidth to each cell if there is enough power headroom. More high power bandwidth can further help a cell with a large population of cell edge users when needed. For example, one half of the bandwidth resource with high power could be assigned to cells with large cell-edge user equipment resource block (RB) loadings when power budget is available.

Figure 2:
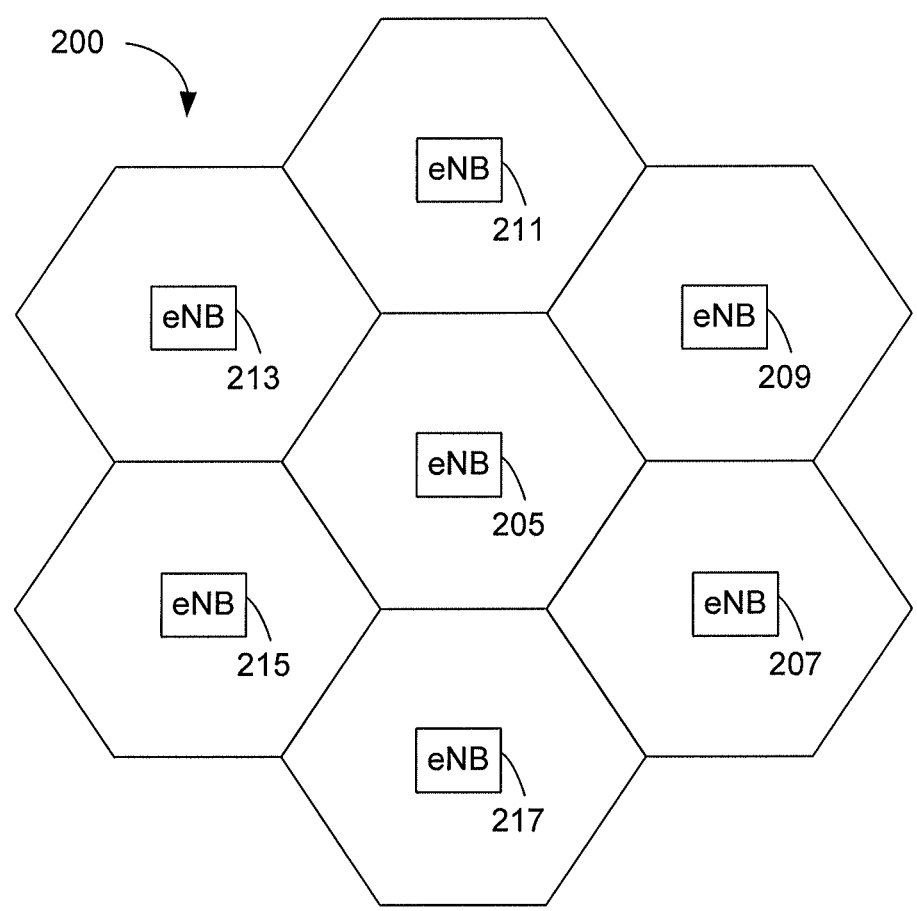
FIG. 2 illustrates an example communications system according to example embodiments described herein.

FIG. 2 illustrates a communications system 200 having a plurality of cells controlled by a plurality of corresponding eNBs, such as eNBs 205 through 217. A first-order neighboring eNB may be defined as eNBs that are directly adjacent to one another. As shown in FIG. 2, eNBs 207 through 217 are first-order neighboring eNBs of eNB 205. A second-order neighboring eNB may be defined as eNBs that are not directly adjacent to one another but are neighboring eNBs to one intermediate eNB. As shown in FIG. 2, eNBs 209 and 215 are second-order neighboring eNBs (through intermediate eNB 205). Similar definitions may be had for higher-order neighboring eNBs.

For any given (serving) cell, the perceived interference from any of its neighbor cells is different. Some surrounding cells may incur very strong interference, but others can cause relatively weak interference. Based on the interference metric, denoted by Aij representing an interference from cell j and perceived by a serving cell i, the serving cell i can rank its neighbor list from the strongest interference-inducing cell to the weakest interference-inducing cell. If applying a threshold to differentiate the interference levels, we can obtain SI-NRT which includes cells incur interference levels greater than the threshold.

For example, for a serving cell i, let $$\bar{a} = \max_{j} \{A_{ij}\}$$

and the NRT of Cell i denoted by NRT(i), and define a threshold, T0>0. Then SI-NRT(i) of Cell i is defined as a subset of the cell's NRT(i) that satisfies the follow conditions:

$$SI\text{-}NRT(i) = \left\{ \text{Cell } j \,\middle|\, \frac{\bar{a}}{A_{ij}} \leq T_0,\ j \in NRT(i)\ \&\ j \neq i \right\}.$$

In an example embodiment, a default value for T0 is 2 (or 3 dB in log scale). In addition, we define SI-NRT(i)=NRT(i) when T0 is set to zero, making the definition more general. Preferably, the threshold value may be, for example, in the range of 1.5 to 3.0.

In an example embodiment, a dynamic ICIC method may be implemented in a global ICIC controller or in each eNB. The dynamic ICIC method allows additional high power band assignment while considering the resulting interference impacts among the neighbor cells. As a result, the high power bands between neighbor cells can be overlapped as long as the incurring interference is "small" enough as defined by a proposed metric. The dynamic ICIC method can further improve the coverage performance for cells with high-population cell-edge users. It is especially applicable to hotspot zone scenarios such as centralized shopping malls or sports center, with non-uniform cell edge user (CEU) and/or resource block (RB) loadings and cell CEU and/or CCU distribution among neighbor cells.

A system and method for dynamic ICIC assigns high power band dynamically based on CCU/CEU distribution and loading. The interference impact among neighbor cell is characterized by a metric to measure the strong interference neighbor cells. An example metric is a strong interference neighbor relationship table (SI-NRT), which is a subset of a cell's entire neighbor list (NRT) that incurs very strong interference. The method based on SI-NRT for high power band expansion considers both the cell loading and mutual interference impacts. The dynamic method may be implemented in an Operation and Support Subsystem (OSS) that assigns high power bands globally. Additionally or alternatively, the dynamic method may be implemented distributively in each cell with an X2 based interface.

For example, if an inter-eNB interface such as an X2 interface is available, the eNBs so coupled may share interference information as well as other neighboring relationship information. The dynamic ICIC method may be implemented in a cluster ICIC controller or a plurality of ICIC controllers. More details about the global ICIC controller and the cluster ICIC controller may be found in U.S. application Ser. No. 13/106,598.

Figure 3:
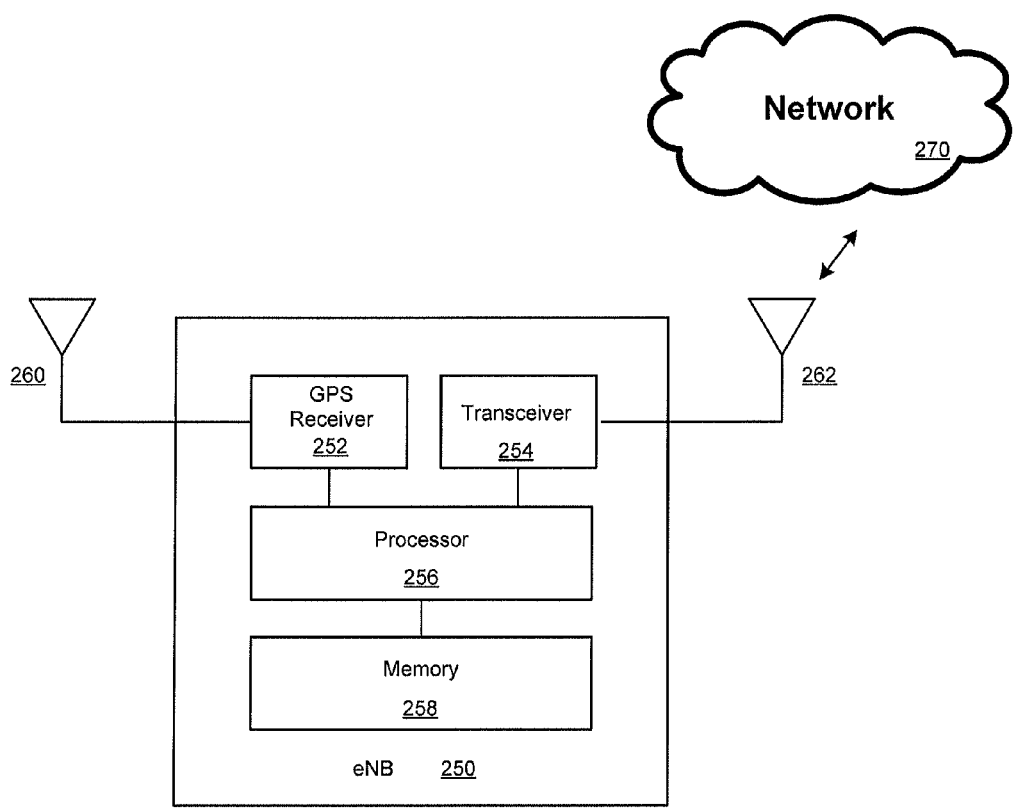
FIG. 3 illustrates an example eNB according to example embodiments described herein.

FIG. 3 illustrates an example cell controller 250 according to example embodiments described herein. Cell controller 250 may be in an OSS or in an eNB. Cell controller 250 includes a processor 256 coupled with non-transitory memory storage medium 258. Cell controller 250 may also includes multiple processors and multiple memory storages. Cell controller 250 is configured to generate a strong interference neighbor relationship table (SI-NRT) based on a predefined threshold value and interferences from a plurality of neighbor cells. Cell controller 250 also includes transceiver 254 that communicates with network 270 wirelessly via antenna 262. Transceiver 254 may also communicate with network 270 via fibers or other cable connections. Network 270 may includes communication channels to UEs and other Cell controllers. Cell controller 250 may further include a GPS receiver 252 coupled with GPS antenna 260.

Non-transient storage medium 258 stores a set of instructions for assigning high power frequency bands in a communication system. The set of instructions to direct the processor to perform the following acts.

The processor 256 generates a SI-NRT based on a predefined threshold value and interferences from a plurality of neighbor cells. The predefined threshold value defines a tolerable interference level compared with the strongest interference among neighbor cells. The predefined threshold value may be different in different communication systems.

The processor 256 determines whether a cell needs additional high power frequency band based on its performance or other reasonable parameters. In an embodiment, the performance parameters include cell edge and center UE distributions as well as UE traffic and/or resource utilization scenarios. For example, the processor 256 may determine whether a cell needs additional high power frequency band based on its CEU, CCU, a ratio of traffic loading between all CEUs and all CCUs, a ratio resource usage between all CEUs and all CCUc, or a combination of the above information.

In an example embodiment, the processor 256 may also determine the number of high power frequency bands (colors) a cell shall use based on a performance metric such as cell CEU loading ($R_{CEU}$), which is compared with two different thresholds for the decision making. If a cell having an $R_{CEU}$ less than a first threshold, the processor only assigns one color to the cell; if a cell having an $R_{CEU}$ greater or equal than the first threshold and less than a second threshold, the processor assigns two colors to the cell; otherwise, if the cell having an $R_{CEU}$ greater or equal than the second threshold, the processor assigns up to three colors to the cell by determining whether there is available high power frequency band in the plurality of neighboring cells based on the SI-NRT. Additionally or alternatively, the processor may assign colors based on a few decision rules based on the SI-NRT.

For example, the processor 256 in a cell may only assign the third color when the third color is not used by any cell in the corresponding SI-NRT (to minimize perceived interference) and none of the cells having cell j in their SI-NRT lists is using this color (to minimize the induced interference to its neighbor cells). In other words, the processor 256 in a cell assigns the third color to the cell i when the assignment does not change the cell's own SI-NRT and any SI-NRT of the plurality of neighbor cells.

After determining whether there is available high power frequency band in the plurality of neighboring cells based on the SI-NRT, cell controller 250 then notify corresponding eNB about the new color configuration.

Figure 4:
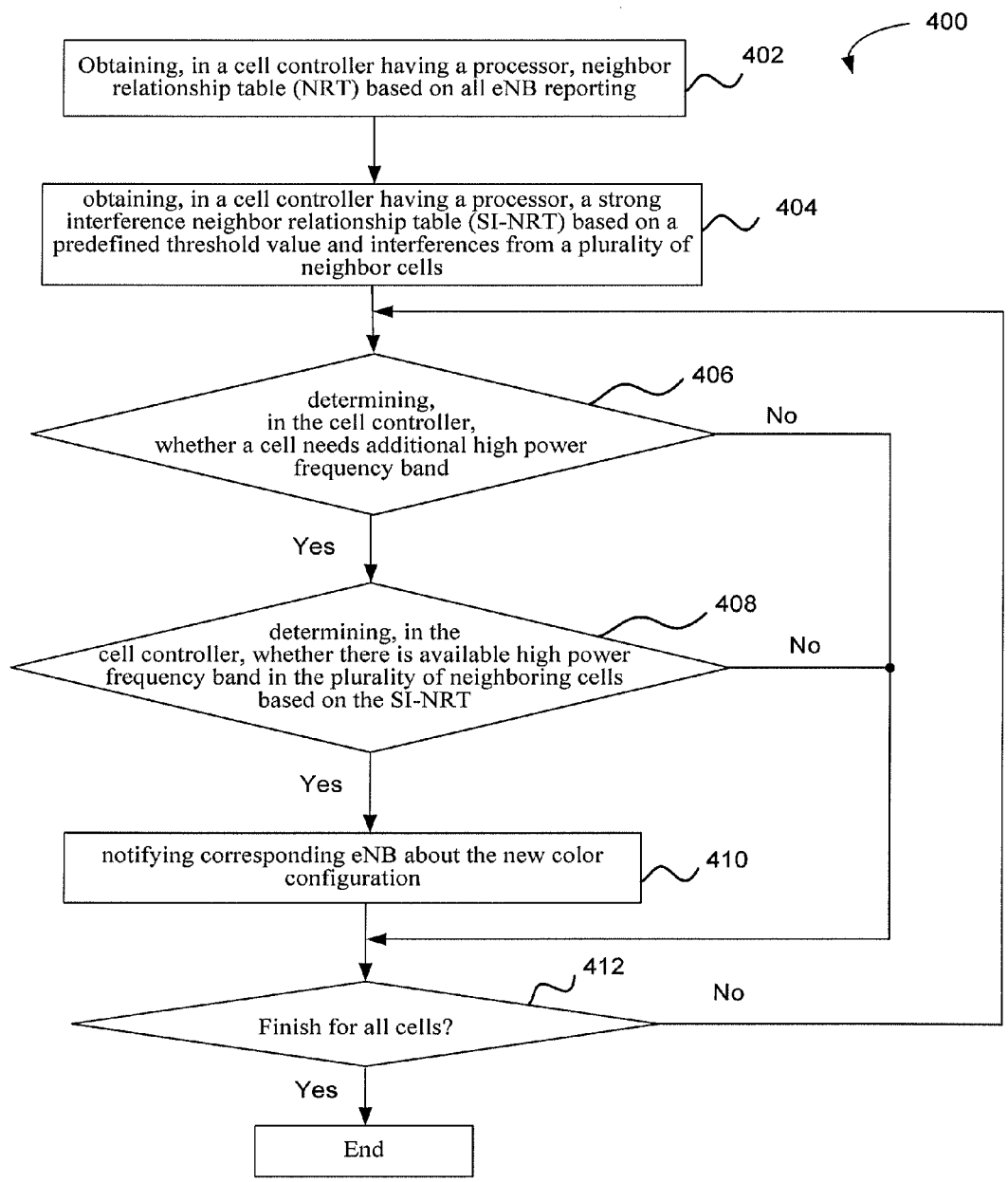
FIG. 4 illustrates an example flow diagram of an ICIC method implemented in a global ICIC controller based on a SI-NRT according to example embodiments described herein.

FIG. 4 illustrates an example flow diagram of an ICIC method 400 implemented in a global ICIC controller based on a SI-NRT according to example embodiments described herein.

For example, the global ICIC controller may be an OSS that performs the following acts to implement a slow dynamic ICIC enhancement. The OSS may be implemented in a cell controller having a processor that is configured to manage operation activities of one or multiple cells. For example, the OSS may be a server configured to manage all cells in a city.

In act 402, the OSS periodically receives eNB long-term averaging reporting such as reference signal received power (RSRP) and cell CEU loading ($R_{CEU}$).

In act 404, the OSS generates a strong interference neighbor relationship table (SI-NRT) based on a predefined threshold value and interferences from a plurality of neighbor cells. For example, the OSS may calculates/updates NRT and SI-NRT based on all eNB reporting. The OSS may run color assignment algorithm with six color setting to find two colors for cells based on {Aij}.

In act 406, the OSS determines whether a cell needs additional high power frequency band. For example, the OSS assigns each cell with two colors (i.e., ⅓ bandwidth) by a FFR algorithm based on, e.g., NRT. Based on SI-NRT and proposed criteria, the OSS may further determine to use only one color, the two colors, or three colors (by borrowing a third color) for a cell:

A cell will use one color if $R_{CEU}$ is less than a first threshold. A default value for the first threshold may be ⅙.

A cell will use the two colors if $R_{CEU}$ greater or equal than the first threshold and less than a second threshold. A default value for the second threshold may be ⅓.

Otherwise, the OSS assigns Cell j to use three colors if a plurality of conditions are satisfied with a third color; or the Cell j uses the two colors (i.e., a fixed ⅓ of bandwidth for the cell already assigned based on NRT), if anyone of the plurality of conditions is not satisfied for a third color.

For example, in act 408, the OSS may determine whether there is available high power frequency band in the plurality of neighboring cells based on the SI-NRT. The decision rules are described below. If the third color is not used by any of its SI-NRT cells for Cell j (to minimize perceived interference) and none of the cells having cell j in their SI-NRT lists is using the third color (to minimize the induced interference to its neighbor), the OSS assigns Cell j to use three colors including the third color. If there is new color available, the OSS continue to act 410. Otherwise, the OSS goes to act 412 until all local cells are checked.

In act 410, the OSS notifies corresponding eNB about the new color configuration. In act 412, if all cells have been check, the method then ends. Otherwise, the OSS returns to act 406 to check the next cell controlled by the OSS.

Figure 5:
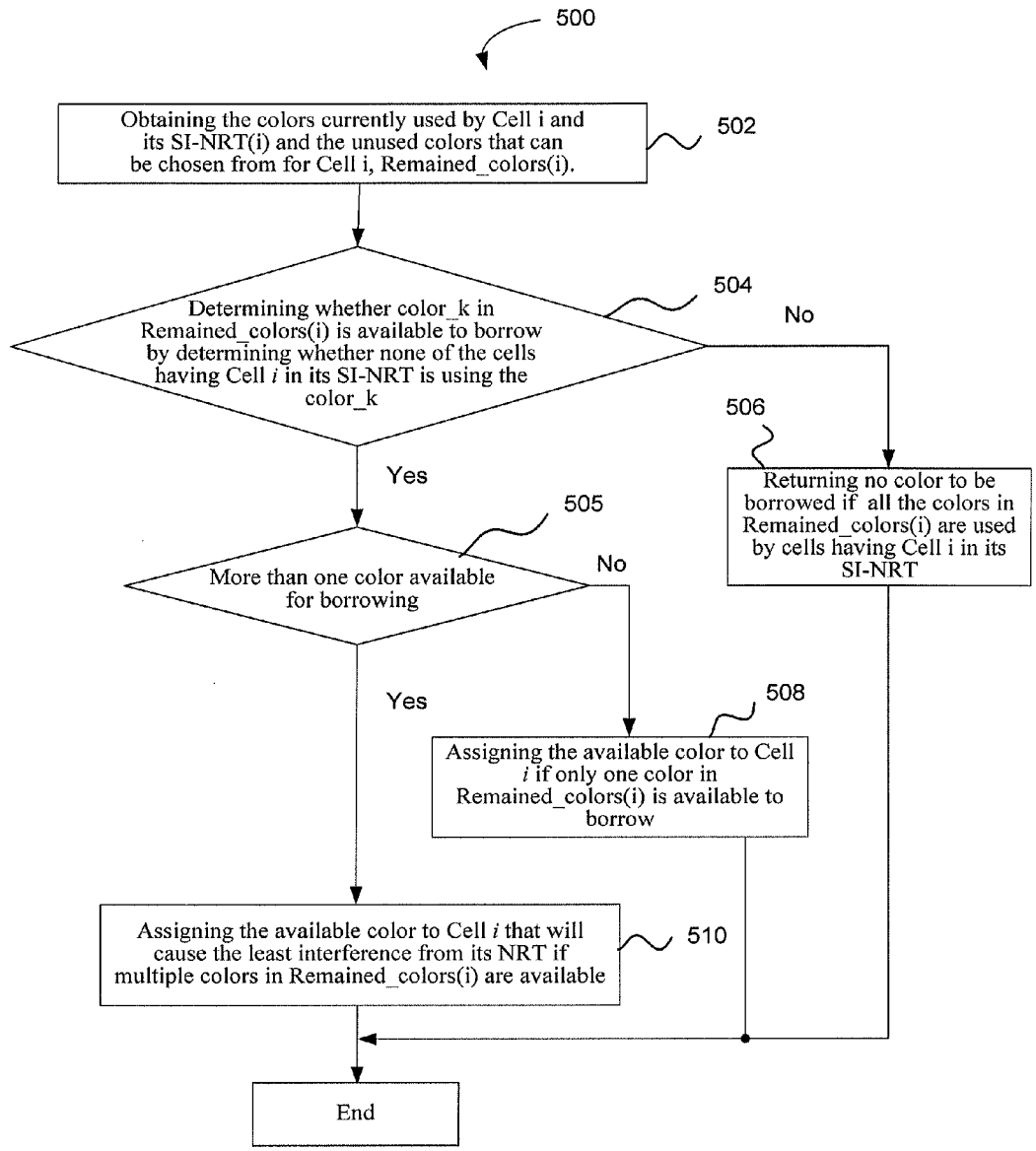
FIG. 5 illustrates an example flow diagram of color borrowing method based on a SI-NRT according to example embodiments described herein.

FIG. 5 illustrates an example flow diagram of color borrowing method 500 based on a SI-NRT and the decision rules below according to example embodiments described herein. The color borrowing method 500 may be implemented in eNB distributively. For example, an eNB takes input such as colors assigned to all cells currently, number of colors needed for Cell i, SI-NRT(i) and interference Aij. The eNB then outputs color(s) to be used by Cell i.

To borrow a color for a cell (i), eNB performs the following acts to see if any color can be found and granted to Cell i:

In act 502, an eNB obtains the colors currently used by Cell i and its SI-NRT(i) and the unused colors that can be chosen from for Cell i, Remained_colors(i). For example, the eNB first identifies the colors currently used by Cell i and its SI-NRT(i). The eNB then find the unused colors that can be chosen from for Cell i, Remained_colors(i).

In act 504, the eNB determines whether color_k in Remained_colors(i) is available to borrow by determining whether none of the cells having Cell i in its SI-NRT is using the color_k. For example, if none of the cells having Cell i in its SI-NRT is using the color_k, the color_k can be one candidate color to used by Cell i. The eNB checks all colors in Remained_colors(i) and identifies all candidate colors.

After the above searching process for candidate colors from unused colors, the eNB determines whether there is more than one color available for borrowing in act 505. Based on the determination results in acts 504 and 505, there are a few outcomes described below.

In act 506, the eNB returns no color to be borrowed when all the colors in Remained_colors(i) are used by cells having Cell i in its SI-NRT if there is no color available as determined in act 504.

In act 508, the eNB assigns the available color to Cell i if only one color in Remained_colors(i) is available to borrow.

If there are multiple colors available, in act 510, the eNB assigns the available color to Cell i that will cause the least interference from its NRT if multiple colors in Remained-_colors(i) are available. For example, if two or more un-used candidate colors have been found, among multiple candidate colors found, cell i may borrow the color that will incur the least interference from its NRT (all neighbors of Cell i).

In some cases where the two or more colors lead to the same minimum interference, then Cell i may borrow one randomly chosen color.

In short, the current disclosure provides a dynamic ICIC method and provides the following benefits:

Proposed a new concept to identify strong interference NRT such that the neighbor cells with mutual strong interference impacts are defined High power band expansion/color borrowing took into account the cell loading, color usages among neighboring cells, and interference impacts of additional colors to be borrowed;

Provided a color borrowing algorithm that is able to improve performance under non-uniform networks;

Solutions to slow and fast dynamic ICIC performance enhancement;

Flexible ways of implementing the algorithm: OSS based and/or X2 interface based.

Although the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

We claim:

1. A method for assigning high power frequency bands in a communication system, comprising:

generating, in a cell controller having a processor, a strong interference neighbor relationship table (SI-NRT) for a cell based on a predefined threshold value and interferences from a plurality of neighbor cells, wherein the interferences are based on interference measurement reports of all users in the cell and all users in the plurality of neighbor cells;

determining, in the cell controller, whether the cell needs an additional high power frequency band based on a ratio of traffic loads between cell edge users (CEUs) and cell center users (CCUs);

dynamically allocating, in the cell controller, a high power frequency band to the cell in accordance with the following conditions being satisfied:
the cell needs the high power frequency band, and
the high power frequency band is assigned to, but is not used by, any of the plurality of neighbor cells, and
the high power frequency band is not used by any cell whose SI-NRT includes the cell, wherein one color of a six-color fractional frequency reuse is dynamically allocated to the cell, and wherein two colors of the six-color fractional frequency reuse are dynamically allocated to one of the plurality of neighbor cells, in accordance with the interference measurement reports and traffic loads of the cell and the plurality of neighbor cells.

2. The method of claim 1, wherein the cell controller generates the SI-NRT based on a ratio between a maximum interference level and each of a plurality of interference levels from the plurality of neighbor cells.

3. The method of claim 2, wherein the SI-NRT consists of cells that have the ratio greater than the predefined threshold value.

4. The method of claim 3, wherein the SI-NRT for cell i consists of cells that meet the following condition:

$$SI\text{-}NRT(i) = \left\{ \text{Cell } j \,\middle|\, \frac{\bar{a}}{A_{ij}} \le T_0,\, j \in NRT(i) \,\&\, j \ne i \right\},$$

wherein NRT(i) denotes a neighbor relationship table for cell i, $A_{ij}$ is the interference induced from cell j to cell i, $$\bar{a} = \max_{j}\, \{A_{ij}\},$$

and $T_0$ is the predefined threshold value.

5. The method of claim 4, wherein determining, in the cell controller, whether there is an available high power frequency band in the plurality of neighbor cells based on the SI-NRT for cell i comprises at least one of the following:
   determining whether a high power frequency band candidate is used by the plurality of neighbor cells;
   determining whether the high power frequency band candidate is used by the cells in the SI-NRT(i); and
   determining whether any cell having cell i in its SI-NRT is using the high power frequency band candidate.

6. The method of claim 4, further comprising:
   assigning the high power frequency band to the cell i when the assigning does not change its own SI-NRT and any SI-NRT of the plurality of neighbor cells.

7. A cell controller, comprising:
   a processor coupled with a non-transient storage medium;
      the non-transient storage medium storing a set of instructions for assigning high power frequency bands in a communication system, the set of instructions to direct the processor to perform acts of:
      generating a strong interference neighbor relationship table (SI-NRT) for a cell based on a predefined threshold value and interferences from a plurality of neighbor cells, wherein the interferences are based on interference measurement reports of all users in the cell and all users in the plurality of neighbor cells;
      determining whether the cell needs additional high power frequency band based on a ratio of traffic loads between cell edge users (CEUs) and cell edge users (CCUs);
      dynamically allocating a high power frequency band to the cell in accordance with the following conditions being satisfied:
         the cell needs the high power frequency band, and
            the high power frequency band is assigned to, but is not used by, any of the plurality of neighbor cells, and the high power frequency band is not used by any cell whose SI-NRT includes the cell,
         wherein one color of a six-color fractional frequency reuse is dynamically allocated to the cell, and wherein two colors of the six-color fractional frequency reuse are dynamically allocated to one of the plurality of neighbor cells, in accordance with the interference measurement reports and traffic loads of the cell and the plurality of neighbor cells.

8. The cell controller of claim 7, wherein the cell controller is configured to generate the SI-NRT based on a ratio between a maximum interference level and each of a plurality of interference levels from the plurality of neighbor cells.

9. The cell controller of claim 8, wherein the SI-NRT consists of cells that have the ratio greater than the predefined threshold value.

10. The cell controller of claim 9, wherein the SI-NRT for cell i consists of neighbor cells that meet the following condition:

$$SI\text{-}NRT(i) = \left\{ \text{Cell } j \,\middle|\, \frac{\bar{a}}{A_{ij}} \le T_0,\, j \in NRT(i) \,\&\, j \ne i \right\},$$

wherein NRT(i) denotes a neighbor relationship table for cell i, $A_{ij}$ is the interference induced from cell j to cell i, $$\bar{a} = \max_{j}\, \{A_{ij}\},$$

and $T_0$ is the predefined threshold value.

11. The cell controller of claim 10, wherein determining whether there is available high power frequency band in the plurality of neighbor cells based on the SI-NRT for cell i comprises at least one of the following:
   determining whether a high power frequency band candidate is used by the plurality of neighbor cells;
   determining whether the high power frequency band candidate is used by the cells in the SI-NRT(i); and
   determining whether any cell having cell i in its SI-NRT is using the high power frequency band candidate.

12. The cell controller of claim 10, wherein the set of instructions further directs the processor to perform acts of:
   assigning the high power frequency band to the cell i when the assigning does not change its own SI-NRT and any SI-NRT of the plurality of neighbor cells.

13. A communication system, comprising:
   a plurality of cells communicating with each other, each cell of the plurality of cells comprising a cell controller having a processor configured for:
      generating a strong interference neighbor relationship table (SI-NRT) for the each cell based on a predefined threshold value and interferences from a plurality of neighbor cells, wherein the interferences are based on interference measurement reports of all users in the cell and all users in the plurality of neighbor cells;
      determining whether the each cell needs an additional high power frequency band allocated among one of the plurality of neighbor cells based on a ratio of traffic loads between cell edge users (CEUs) and cell center users (CCUs);
      determining whether there is available a high power frequency band in the plurality of neighbor cells based on the SI-NRT;
      dynamically allocating an available high power frequency band to the each cell that is also allocated to, but not used by, one of the plurality of neighbor cells,
      wherein one color of a six-color fractional frequency reuse is dynamically allocated to one of the plurality of the cells, and two colors of the six-color fractional frequency reuse another one of the plurality of cells, in accordance with the interference measurement reports and traffic loads of the plurality of cells.

14. The communication system of claim 13, wherein the processor is configured to generate the SI-NRT based on a ratio between a maximum interference level and each of a plurality of interference levels from the plurality of neighbor cells.

15. The communication system of claim 14, wherein the SI-NRT consists of cells that have the ratio greater than the predefined threshold value.

16. The communication system of claim 15, wherein the SI-NRT for cell i consists of cells that meet the following condition:

$$SI\text{-}NRT(i) = \left\{ \text{Cell } j \,\middle|\, \frac{\bar{a}}{A_{ij}} \leq T_0, \, j \in NRT(i) \,\&\, j \neq i \right\},$$

wherein NRT(i) denotes a neighbor relationship table for cell i, $A_{ij}$ is the interference induced from cell j to cell i, $$\bar{a} = \max_j \{A_{ij}\},$$

and $T_0$ is the predefined threshold value.

17. The communication system of claim 16, wherein the processor is configured to:
    determine whether a high power frequency band candidate is used by the plurality of neighbor cells;
    determine whether the high power frequency band candidate is used by the cells in the SI-NRT(i); and
    determine whether any cell having cell i in its SI-NRT is using the high power frequency band candidate.

18. The communication system of claim 16, wherein the processor is configured to assign the high power frequency band to the cell i when assigning the high power frequency band does not change its own SI-NRT and any SI-NRT of the plurality of neighbor cells.

19. The method of claim 1, wherein the plurality of neighbor cells are all neighbor cells of the cell, the SI-NRT refers to a subset of the plurality of neighbor cells, and the cell controller generates the SI-NRT based on interferences from the subset satisfying the predefined threshold value.

20. The method of claim 1, the dynamically allocating comprising dynamically allocating the high power frequency band to the cell when the high power frequency band is not used by any one of the plurality of neighbor cells referred in the SI-NRT of the cell and the high power frequency band is not used by any one of the plurality of neighbor cells whose SI-NRT includes the cell.

* * * * *